United States Patent
Bekedam et al.

(10) Patent No.: US 9,218,265 B2
(45) Date of Patent: Dec. 22, 2015

(54) MONITORING AND CONTROLLING THE OPERATION OF DEVICES IN A DISTRIBUTED NETWORK OF BROADCAST DEVICES

(75) Inventors: Harmen Bekedam, Overijssel (NL); Menno De Jong, Enschede (NL); Riemer Andries van Rozen, Almelo (NL)

(73) Assignee: EchoStar Global B.V., Almelo (NL)

( * ) Notice: Subject to any disclaimer, the term of this patent is extended or adjusted under 35 U.S.C. 154(b) by 567 days.

(21) Appl. No.: 13/032,471

(22) Filed: Feb. 22, 2011

(65) Prior Publication Data

US 2011/0206136 A1    Aug. 25, 2011

(30) Foreign Application Priority Data

Feb. 22, 2010    (EP) .................................... 10250311

(51) Int. Cl.
| | | |
|---|---|---|
| G06F 11/36 | (2006.01) | |
| H04N 7/173 | (2011.01) | |
| H04N 17/00 | (2006.01) | |
| H04N 21/262 | (2011.01) | |
| H04N 21/442 | (2011.01) | |
| H04N 21/6543 | (2011.01) | |
| H04N 21/658 | (2011.01) | |
| H04H 20/12 | (2008.01) | |

(52) U.S. Cl.
CPC .......... *G06F 11/3664* (2013.01); *G06F 11/368* (2013.01); *H04N 7/173* (2013.01); *H04N 17/004* (2013.01); *H04N 21/26291* (2013.01); *H04N 21/4424* (2013.01); *H04N 21/6543* (2013.01); *H04N 21/6582* (2013.01); *H04H 20/12* (2013.01)

(58) Field of Classification Search
None
See application file for complete search history.

(56) References Cited

U.S. PATENT DOCUMENTS

| | | | |
|---|---|---|---|
| 5,983,022 A | 11/1999 | Watkins et al. | |
| 2002/0035404 A1* | 3/2002 | Ficco et al. | 700/65 |
| 2004/0054771 A1* | 3/2004 | Roe et al. | 709/224 |
| 2004/0093370 A1 | 5/2004 | Blair et al. | |
| 2004/0202332 A1* | 10/2004 | Murohashi et al. | 381/17 |
| 2005/0091373 A1* | 4/2005 | Ciapala et al. | 709/224 |
| 2005/0154500 A1* | 7/2005 | Sonnenrein et al. | 701/1 |
| 2005/0286435 A1* | 12/2005 | Ogawa et al. | 370/252 |
| 2006/0101495 A1 | 5/2006 | Yoshida et al. | |
| 2008/0266460 A1* | 10/2008 | Hirosawa | 348/700 |
| 2010/0319037 A1* | 12/2010 | Kim et al. | 725/81 |
| 2011/0055889 A1* | 3/2011 | Neill | 725/132 |
| 2011/0191813 A1* | 8/2011 | Rozhavsky et al. | 725/110 |

FOREIGN PATENT DOCUMENTS

| | | |
|---|---|---|
| EP | 1 478 193 A2 | 11/2004 |
| WO | 2009/041943 A1 | 4/2009 |

\* cited by examiner

*Primary Examiner* — Frederick Bailey
(74) *Attorney, Agent, or Firm* — Lowe Graham Jones PLLC

(57) ABSTRACT

The invention relates to a system and method for monitoring and controlling the operation of devices in a distributed network of broadcast devices, such as Set Top Boxes (STBs). Such devices typically require periodic updates as new versions of operating software is developed. However, it is not possible to guarantee that all devices that have received an updated software version are able to operate correctly. The system initiates a test for a STB and monitors in real time the state of the STB as the software download occurs. The state of the STB is reported to a system controller and the results are output to a test engineer. Other devices in the broadcast network can be controlled by the controller and various troubleshooting or operational tests performed.

19 Claims, 8 Drawing Sheets

MONITORING AND CONTROLLING THE OPERATION OF DEVICES IN A DISTRIBUTED NETWORK OF BROADCAST DEVICES

PRIORITY CLAIM

This application claims priority to European Patent Application Number 10250311.7, filed on Feb. 22, 2010, and titled Monitoring and Controlling the Operation of Devices in a Distributed Network of Broadcast Devices, which is incorporated herewith in its entirety.

FIELD OF THE INVENTION

This invention relates to a system and method for monitoring and controlling the operation of devices in a distributed network of broadcast devices, and in particular to a system and method for debugging distributed electronic devices, such as set-top boxes, to which software can be downloaded.

BACKGROUND OF THE INVENTION

Electronic devices for receiving television or other audio-visual media at home have become increasingly complex in recent years in terms of both design and operation. Consequently, television receivers are typically controlled by sophisticated software that manages all aspects of the devices' operation, including providing the functionality needed by users to tune the device to receive broadcasts, to select a channel, and to program the device for later recording. In addition, the software also must provide the underlying functionality required to decode an audio-video signal, present the decoded data via the screen and speakers to a viewer, and, for interactive services, capturing inputs from the user and transmitting these to a broadcaster for processing.

The investment made in a television receiver for the home, both in respect of its development, and the cost to the purchaser, typically means that it has a lifespan of several years, perhaps say between five and ten for example. The lifespan of the operational software, or at least the current version, can be much shorter however, reflecting changes in the broadcast industry standards, additional services that the broadcaster wishes to provide, or the need to add simple updates required to improve performance or security.

It is not uncommon therefore for several versions of software for a set-top-box (STB) to be released during the software lifecycle. Each version must be tested to ensure that it runs without error on each of the STBs in the broadcast network. Since, it is not always known which production version of the software is currently running on a customer's STB, download tests are often performed to verify that each version takes the download, that is, the software version upgrades correctly to the new version of the software, and subsequently operates in the manner expected without error.

Test engineers can verify whether the upgrade has been successful by capturing traces from the STB's serial port, using programs like Microsoft's ° HyperTerminal or Tera-Term from Ayera Technology Inc., which allow an engineer at a remote computer to connect to the STB by modem or Ethernet connection. The engineer must then verify the upgrade by reading the information presented on screen. This can be a time consuming process, and can only be carried out by one engineer operating on one STB at a time.

We have therefore appreciated that there is a need for an improved apparatus for and method of facilitating delivery of operational and control software to distributed electronic devices, such as STBs, and to ensure that the software, once downloaded, has been successfully installed and is capable of operating on the device in a stable manner and without errors.

SUMMARY OF THE INVENTION

In one embodiment, a system for monitoring and controlling the operation of devices in a distributed network of broadcast devices is provided. The system comprises at least one AV decoder device for decoding video and/or audio signals, the AV decoder device being operable to output state information representative of its internal state; a controller; a network for transmitting data signals between the controller and the at least one AV decoder device; wherein, during a device testing phase, the controller is operable to transmit control and/or AV content data to the at least one AV decoder device causing the at least one AV decoder device to undertake an action in response to the data; and wherein, during the device testing phase, the at least one AV decoder device is operable to undertake an action in response to the data transmitted by the controller, and to transmit state information data to the controller; and the controller is operable to output a data result based on the state information data received from the at least one AV decoder device.

Other embodiments provide devices, methods, or computer program products for monitoring and controlling the operation of devices in a distributed network of broadcast devices, as described further below.

BRIEF DESCRIPTION OF THE DRAWINGS

Examples of the invention will now be described in more detail, by way of example, and with reference to the drawings in which.

DETAILED DESCRIPTION OF THE PREFERRED EMBODIMENTS

An example of the invention concerns a system comprising a number of distributed hardware devices in communication with one another by means of a computer network, namely a Set Top Box, Audio Video Modulator and broadcast network. Generally speaking, each device in the network comprises a processor and a memory and will be controlled by respective software components encoded in one or more object orientated programming languages. Each device can be thought of as a separate entity in the distributed system, with a respective state and behaviour. In this context, an entity can be thought of as a component in the network that performs a role, and a device as a dedicated hardware platform that performs the role of an entity, or one or more entities. It will be appreciated for example that while all entities in a broadcast system could be modelled and installed on a single computer device, in practice, separate devices are required to protect the different interests and requirements of the parties in the network: a STB device is needed for a television viewer to watch television in their home for example, while a television broadcaster will have a modulator and transmitter hardware for transmitting a signal to the STB. The distinction between devices and entities is a useful one, as the following discussion will focus more on the software components installed on the devices, and so which represent entities in the network.

Although, the implementation of the invention is not limited to object orientated programming languages, such languages are advantageous, because they allow the different components in the system to be developed on a modular basis. Further, as is common practice in such systems, the state and behaviour of the respective devices can be exposed by schemas.

Figure 1:
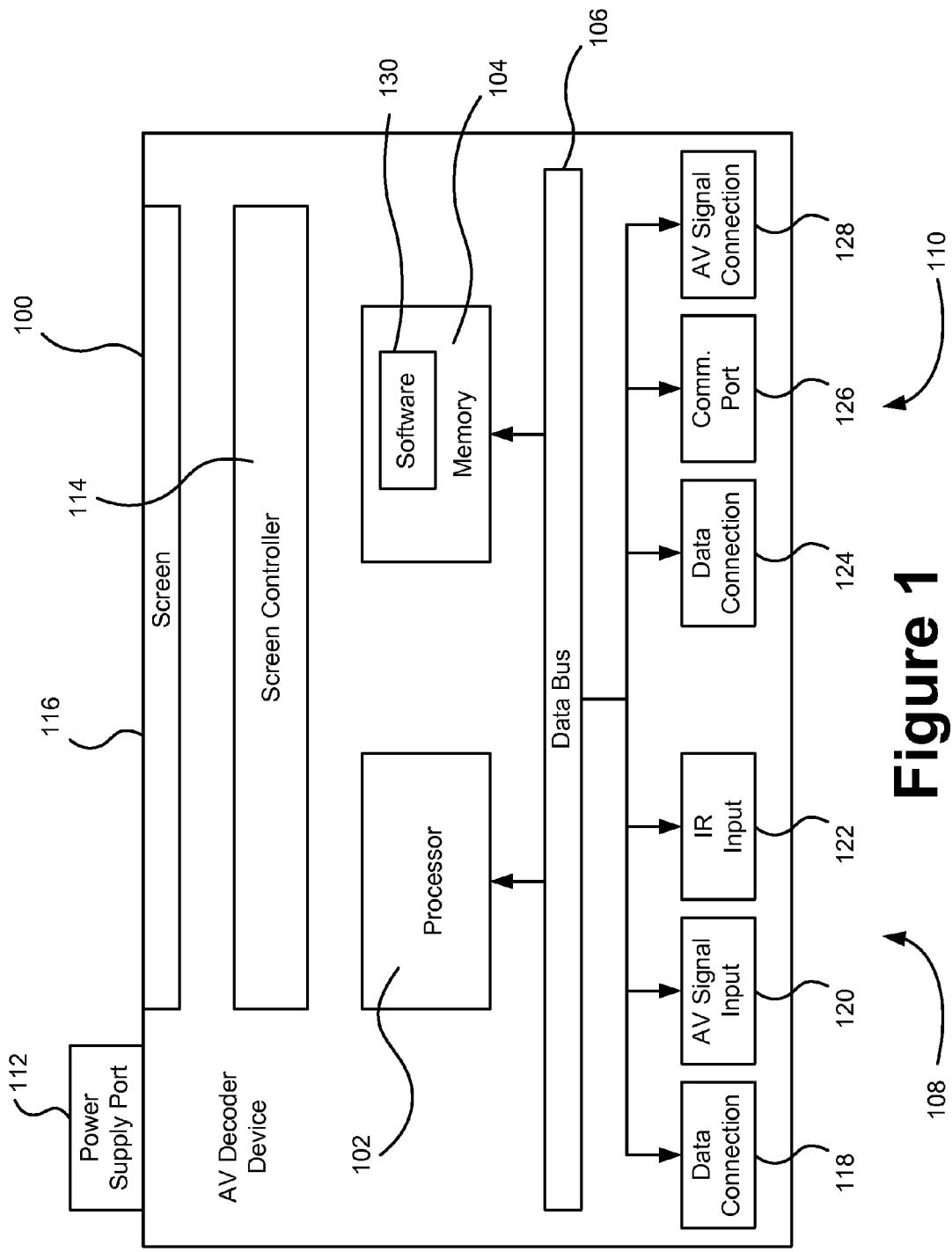
FIG. 1 is a schematic illustration of an example television receiver, such as a Set Top Box (STB)

FIG. 1 is a schematic diagram of a simplified AV decoder device 100 for receiving television or other audio-visual media, such as a Set Top Box (STB), cable box, television set, or other television signal decoder, such as a media enabled Personal Computer (PC) or workstation. For convenience, and without limitation, the AV decoder device 100 in the following discussion will be referred to as a Set Top Box (STB). It will however be appreciated that the technical discussion and advantages provided by the invention will be substantially the same for other hardware platforms.

The STB comprises a processor 102 and memory 104, connected by a data bus 106 to input 108 and output terminals 110. A power supply port 112 is provided for connecting the device to a power supply such as mains power. Screen controller 114 is connected to the processor 102 and controls the display of information on screen 116. In the case of combined decoder-television set, the screen 116 may be the main television screen. For a standalone STB decoder, the screen 116 may be a LCD for displaying the operational state of the device 100 and control information to a user.

Input terminals 108 may comprise one or more of: a data connection 118 for receiving data via DSL (Digital Subscriber Line), ADSL (Asynchronous Digital Subscriber Line), Ethernet or other suitable transmission protocol over a telephone line; an audio-video signal input 120 for receiving one or more of satellite, cable over-the-air (terrestrial), or Internet originating television broadcast transmissions; and a user IR input 122 for receiving data signals from a viewer-operated remote controller.

Output terminals 110 may include one or more of: a data connection 124 for receiving data via DSL, ADSL, Ethernet or other suitable transmission protocol over a telephone line; serial or parallel communication ports 126; and an output AV signal connection 128 for outputting a television signal to an attached television screen, such as by SCART, RF, composite video, S-Video, component video, D-Terminal, VGA, and HDMI (High Definition Multimedia Interface).

Stored in memory 104, a tangible non-transitory medium, for operation by the processor 102 is software 130, which as described above, provides operational and control functionality for a user to interact with the device, and for the device to communicate with the broadcast system. It will be appreciated that in the following discussion, the software 130 is to be updated by means of a new software version.

The tangible non-transitory medium, memory 104, can be used solely for long term storage of the software, operating systems and/or applications, and data settings that are required for the operation of the device 100 and processor 102. It can also be provided with sufficient capacity for the storage of audio-visual data for time-shift recording. The memory 104 may therefore comprise volatile data storage apparatus, such as DRAM (Dynamic Random-access memory), SRAM (static random access-memory), as well as non-volatile data storage, such as a flash memory, magnetic disk drive, solid state or optical disk drives or combinations.

In alternative embodiments, the processor 102 and memory 104 may be implemented as an application specific integrated circuit (ASIC) or as a system on a chip.

Figure 2:
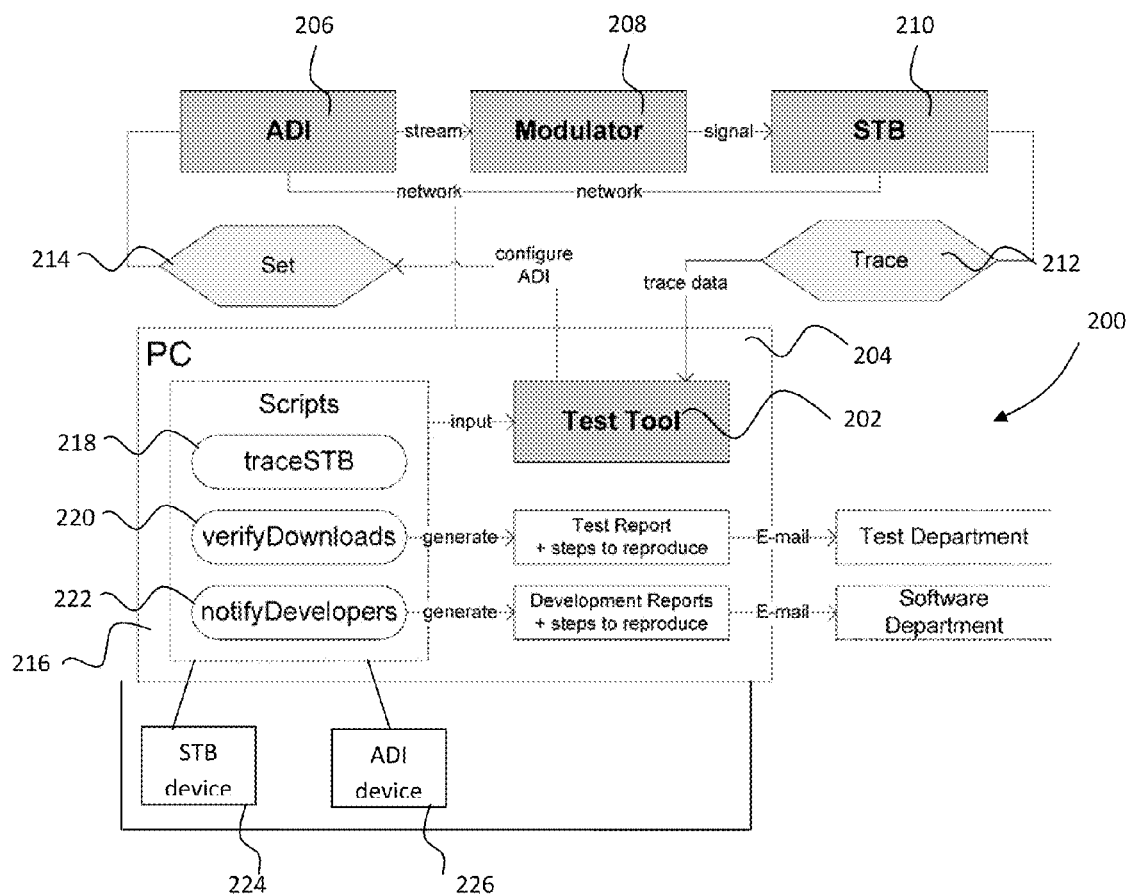
FIG. 2 is a schematic illustration of a system for monitoring in real time a software update for an electronic device, and for determining the state of the device once new software has been downloaded, according to an example of the invention.

Reference should now be made to FIG. 2, which illustrates an example of a system 200 for monitoring in real time a software update for the electronic device 100, and for determining the state of the device 100 once new software has been downloaded.

The system 200 comprises a Test Tool 202 entity, in this case a software module running on a test engineer's PC or workstation 204, and encoded in an object orientated programming language, such as Java or other Object Oriented language such as C and C++. The Test Tool 202 connects to ADI 206, which is in turn connected to modulator 208. The ADI (Advanced Data Inserter) 206 acts as a data streaming device that can be controlled to provide input to the modulator 208 for subsequent transmission to the electronic device 100, which in this example is a STB 210. The ADI 206 can be implemented as a separate server, PC or workstation running a multiplexer/software stream for output to the modulator. The stream output may consist of a collection of streams with audio, video, PCR, DVB, subtitles, and teletext sub-streams.

The output from the modulator 208 is an encoded data stream for transmission to the STB in the normal way, either by satellite, cable, terrestrial or internet connection.

The Test Tooling is connected to the ADI 206 and the STB 210 by means of a data network, which in this example is the Internet, or other network, such as a local or private network, WAN or LAN. The communication protocol between the Test Tool 202, and the STB 210 and ADI 206 is defined by respective schemas called Trace 212 and Set 214. In this example, these are strings expressed in JavaScript Object Notation (JSON), and define respective APIs (Application Program Interfaces).

Generally speaking, an API is a computer abstraction that specifies the routines, data structures, object classes and protocols used to communicate between the separate and distinct components in a distributed system of components. Schemas and APIs allow distributed components to be developed by different parties, often in different computer languages, with the assurance that communication with between the components will be possible as long as the API is followed and implemented.

In FIG. 2, two schemas are illustrated: the Trace schema 212, which specifies the nature of the debugging information that is required from the STB 210, such as boot traces, and error traces; and the Set schema 214 that facilitates for communication between the Test Tool and the stream output of the ADI 206. In particular, the Trace 214 and Set 212 schemas further define the data objects that facilitate communication between the Test Tool module 202, the ADI module 206 and the STB 210 respectively. In this context, Trace 214 and Set 212 can be thought of as gray box interfaces. The system may comprise additional schemas where additional functionality is to be added or aspects of communication controlled.

Communication between the different entities in the system is controlled by one or more scripts 216 running in memory on the test engineer's PC or workstation 204, in conjunction with the Test Tool module 202. The scripts are implemented in an extended version of Javascript to which the necessary device definitions, schemas, and operators for the communication with devices, assertions, guards and multiprocesses have been added. In alternative embodiments, they could be implemented in other suitable scripting languages. The data traffic between the different components is controlled by running of the scripts, which define behaviours that generate data objects sent to devices, and which receive data objects from devices. The sequence of objects is determined by the control flow of the script.

Each object, including the time it was received, or at least its position in the sequence of objects received, can be logged and recorded by the Test Tool module 202. This allows the Test Tool 202 to capture and playback communicated objects (both sent and received by the Test Tooling or associated devices) with respect to the script that generated them. In the case of an assertion failure, for example where the state of a device is found not to agree with an asserted expected state, such a sequence can be used to reproduce a bug by resending the logged objects to the target device, or by rerunning the script to generate them. This enables a test engineer to fully assess the problem in real time.

In FIG. 2, three scripts 216 are illustrated representing the basic functionality of the system, and called TraceSTB 218, VerifyDownload 220 and Notify Developer 222, which provide a download test and bug notification function. One or more further scripts representing additional functionality may be provided, such as the ZapTest script to be described later. TraceSTB 218 provides control of the TestTool module 202 in order for the Test Tool module 202 to receive data objects from a STB 210 in the system. The VerifyDownload Script 220 provides control of the Test Tool module 202 to initiate a software download to a STB 210, and to confirm whether or not the software download has been successful, and Notify Developer Script 222 generates a report based on the results of the VerifyDownload Script 220.

The scripts additionally provide device definitions for the ADI 206 and STB 210. These definitions are abstractions of the behaviour and state of actual devices in the system 200, and specify the communication protocols by which the devices are to communication with the Test Tool 202. Once implemented by a device, adherence to the definitions ensures that a device appears as a communication channel, allowing the Test Tool module 202 to transmit information to the device, and receive information from the device as desired. Communication between devices in this way can be carried out by means of TCP, or UDP based protocols, as well as serial RS232, COM and other protocols for tunnelling through the Internet.

The STB Device script 224 defines a STB in the system 200, allowing the Test Tool module 202 to identify the STB and to communicate with it. An example script is reproduced below.

```
/*declare device stb with its capabilities*/
local device stb; //declares device stb used to communicate with STB
schema stb.Trace //declares schema Trace used to receive traces from
   the STB
   { "description": "the Trace schema is used to expose traces from the
   STB", "version":
   { "description": "version identifier (major.minor.engineering)",
   "type": "string", "visible": false, "default": "1.0.0"
   },
```

```
"text":
{"description": "debugging trace from the STB",
"type": "string", "optional": true
}}
```

When the Test tool module 202 connects to an STB, information about the state and behaviour of the STB is added to the active script. As will be appreciated by those skilled in the art, the Trace schema defines a Gray box interface for the STB device, in which selected elements of the internal state and behaviour of the system for exposure to the Test Tool module for inspection and manipulation are defined. In particular, the schema defines the information that needs to be supplied for a step or object defined in the script to be processed, and the information that can be returned upon successful completion. Fields defined in the schema determine how the tooling displays editable text areas, drop down lists, and checkboxes within a script.

The Test Tool module 202 can then receive a stream of Trace data objects (JSON data objects conforming to the Trace schema) indicating the current state of the STB and providing debugging information. Each object that is received can be regarded as an event.

The ADI Device script 226 defines an ADI device in the system 200, allowing the Test Tool module 202 to identify the ADI and to configure the ADI to take action. An example script is reproduced below.

```
/*declare device adi with its capabilities*/
local device adi; //declares device adi used to transmit stream to STBs
schema adi.Set   //declares schema Set used to configure the ADI
   {"description": "the Set schema is used to configure the ADI",
   "version":
      {"description": "version identifier (major.minor.engineering)",
      "type": "string",
      "visible": false,
      "default": "1.0.0"},
   "stream":
   [ { "description": "configure the ADI to stream these files",
   "fileName":
      {"description": "filename and path"
      "type": "string",
      "optional": true} } ]
}
```

The above example script declares a local device called ADI in the system 200 and declares that the device supports a gray box interface called Set via which the audio/video streaming equipment used to emulate satellite, cable or terrestrial signals can be configured. Once the test Tool module 202 has connected to the ADI device 206 it may send a Set object to configure it in the manner desired. This will be described in more detail below.

The device definitions STB Device 224 and ADI device 226 specify the physical means by which communication from the Test Tool module 202 and an ADI 206 or STB 210 is to take place. As noted above, however, it is the scripts 216 that define the nature of the data objects to be exchanged in such communication.

The TraceSTb script 218 defines a channel between the Test Tool module 202 and the STB to capture the error traces from the STB. The traces are sent to the Test Tool 202 as data objects according to the schema Trace which must be implemented by the STB.

The TraceStb script 218 is intended to be run as an active script, namely a separate script running as a script instance like a process. An active script traceSTB may therefore be instantiated according to specification below for each STB 210 that is to be monitored in the system 200. In this example, the script continually checks for the software version present on the STB 210 and the error traces of the STB and updates its own state accordingly. The script may be represented as follows.

```
/* trace process* /
var trace = active script traceSTB( ) {
   var text;            //used to capture traces from the STB
   var bootVersion;     //used to keep track of boot version
   var hardwareVersion; //used to keep track of hardware version
   var softwareVersion; //used to keep track of software version
   var failure;         //used to store decoder failures
   var downloaded;      //used to track new software is downloaded
   while(true) {
      text = stb?Trace{"version":"1.0.0"}.text;
      //receive trace if(text.contains("BOOT VERSION"))
      { sBootVersion = text.findString("<", ">", ":"); }
      if(text.contains("HARDWARE VERSION"))
         { shardwareVersion = text.findString("<", ">", ":"); }
      if(text.contains("SOFTWARE VERSION"))
         { sSoftwareVersion = text.findString("<", ">", ":");
           downloaded = true; }
      if(text.contains("failure decoding")
         { failure = text; }
   }
}
```

As indicated above, each script initialises a number of variables to hold data defining the state of the STB under consideration. In this example, these are text, bootVersion, hardwareVersion, softwareVersion, failure, and downloaded. These variables are then updated with the information received from the STB in question.

The data held in the three variables bootVersion, hardwareVersion, and softwareVersion are evident and indicated by the name of the variable. Such information is required to detect what the current and therefore to confirm whether the current state is as expected or not.

The text variable is used to capture the actual trace information from the STB and store this in the script in question. In a script, the question mark operator denotes that an object of a certain type is received. Thus stb?Trace{"version": "1.0.0"}; denotes a trace object which has schema version 1.0.0 and is received from the STB by a script process1. Since the text field of the schema is of particular interest to the engineer, the trace can be stored in the text variable by: text=stb?Trace{"version":"1.0.0"}.text.

The subsequent if statements in the traceSTB script search the received Trace data object and extract the bootVersion, hardwareVersion, and softwareVersion data, updating the corresponding variables.

Of the remaining variables downloaded indicates whether the new software has downloaded, and failure is used to store information regarding software failures, such as logging messages generated by the STB 210.

Note that the actual script instance can be accessed by the initial variable trace.

In addition to the Trace schema 218, the STB device 210 is required to implement further interfaces so that the behaviour of the STB device 210 can be properly monitored and verified by the system 200 and in Test Tool module 202.

Figure 3:
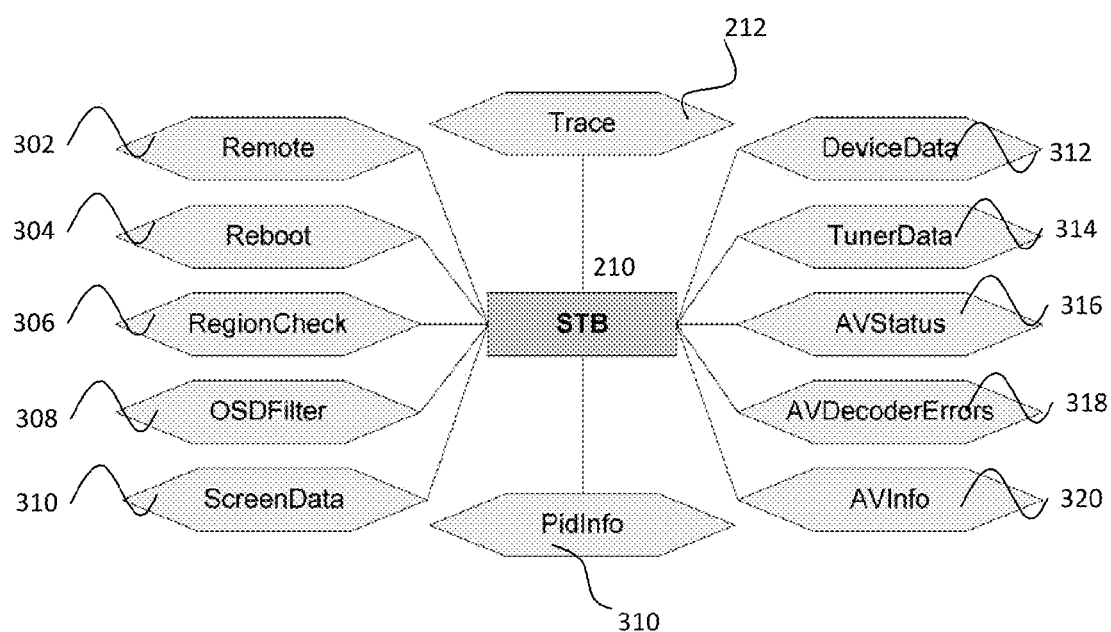
FIG. 3 is a schematic depiction of further interfaces contemplated in the example embodiment of the invention for an STB.

FIG. 3 schematically depicts the schemas interfaces which allow distributed components, including the Test Tool module 202 to communicate with the STB. The interface and schemas are as follows. This list is intended to be purely illustrative and non-limiting, as further schemas may be desired in relation to other aspects of the STB functionality. Also, single schemas in the list could be subsumed into other more generalised schemas if appropriate.

The Remote schema 302 serves to receive remote control key lists from, and send key command to STBs.

Reboot schema 304 serves to reboot the STB and bring it in the desired state.

The RegionCheck schema 306 serves to compare on screen display sections referred to as regions by encoding them as integers.

The OSDFilter schema 308 serves to retrieve an OSD (On Screen Display) section as encoded data.

The ScreenData schema 310 serves to expose STB screen data (in terms of text elements).

The DeviceData schema 312 serves to expose STB device data such as product code, boot version, software version, hardware ID, conditional access ID and uptime.

The TunerData schema 314 serves to expose STB tuner lock data.

The AVStatus schema 316 serves to expose the dynamic audio and video output status of the currently tuned service on the STB.

The AVDecoderErrors schema 318 is used to retrieve the number of decoder errors from the STB with regard to the selected output device since the last AVDecoderErrors object was received. The STB does not start tracking decoder errors until the first AVDecoderErrors object is received.

The AVInfo schema 320 serves to expose the static audio and video output status of the currently tuned service on the STB for a specific output.

The PIDInfo 322 schema serves to expose Program Identifier (PID) information for the current service. Fields are omitted when not available.

Figure 4:
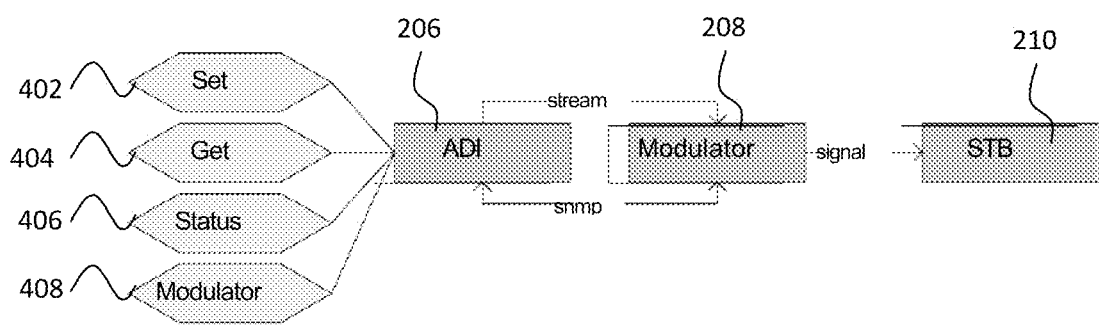
FIG. 4 is a schematic depiction of further interfaces contemplated in the example embodiment of the invention for an ADI.

FIG. 4 illustrates the schemas implemented by the ADI device 206 in more details. In this case, the ADI can be considered as a Unix PC running muxer/streamer software for input to the modulator, and used with the modulator to emulate a satellite input signal for the STB. A number of schemas are contemplated, as follows:

The Set schema (described above) serves to configure the streams the ADI should stream, the bitrate of each stream and the total playout. The stream pids may be remapped (i.e. replaced) and the PCR timing information may be restamped (i.e. recalculated).

The Get schema serves to retrieve the currently available streams.

The Status interface is used to retrieve the current configuration of the ADI. The Modulator interface is used to configure the modulator via SNMP. For each type of modulator a different modulator interface is needed.

A further active script is the VerifyDownload Script 220. Again, a separate active script VerifyDownload script instance may be instantiated according to specification below for each STB 210 that is to be monitored in the system 200, and for each test that is to be performed. In this example, the verifyDownloads script verifies that the STB sequentially contains software versions 153P and 155P, by abstracting from the required 'forced download' state on the STB (the STB Reboot schema may be used for this), and by means of the NotifyDevelopers script can encapuslate the results in a report for the engineer or test department. The script may be represented as follows:

```
/*verification process*/
active script verifyDownloads( )
```

-continued

```
{ //set the ADI to spool 153P
  adi@Set{"version":"1.0.0","streams"[{"filename":"153P"}]};
    // BOOT VERSION: <103B>
    // HARDWARE VERSION : <OGTS>
    // SOFTWARE VERSION : <153P>
  //wait until ADI 206 downloads a software version
    guard(trace.downloaded==true);
  //check if the software version updated to 153P
  assert( trace.bootVersion == 103B &&
    trace.hardwareVersion == OGTS &&
    trace.softwareVersion == 153P,
    "test_engineering@echostar.com");
  trace.downloaded = false;
  /set the ADI to spool 155P
  adi@Set{"version":"1.0.0","streams"[{"filename":"155P"}]};
    // BOOT VERSION : <103B>
    // HARDWARE VERSION : <OGTS>
    // SOFTWARE VERSION : <155P>
  //wait until it downloaded a software version
    guard(trace.downloaded==true);
  //check if the software version updated to 155P
  assert( trace.bootVersion == 103B &&
    trace.hardwareVersion == OGTS &&
    trace.softwareVersion == 155P
    "test_engineering@echostar.com");
  trace.downloaded = false;
}
```

In a script, the exclamation mark operator denotes that an object of a certain type is sent to a device. Thus stb!Set {"version":"1.0.0", streams [{"fileName":"example.ts"}]}; denotes a configuration object which has schema version 1.0.and 0 and is sent from the script 220 to the ADI 206, in this case to initiate download of the two different software versions. An alternative to the exclamation mark operator, is the at-mark operator which both instructs an object to be sent to a device, and instructs the transmitting device to await a reply.

Since the engineer is interested to know if the configuration initiated by Set, a response is requested by means of a send plus receive action denoted by the at-sign.stb@Set {"version":"1.0.0", streams[{"fileName":"example.ts"}]}. Note that since JavaScript is being used in this example, creating, sending and receiving a processed Setobject can be achieved also by the following statements:

```
var setObject;
setObject.Set.version="1.0.0";
setObject.Set.streams[0].fileName="example.ts";
stb @ setObject
```

The adi@Set{"version":"1.0.0","streams"[{"filename": "153P"}]}; command therefore instructs the ADI device 206 to transmit the software download for software version 153P via the modulator to the STB 224, according to the functionality encapsulated in the Set Schema.

The subsequent schema defined command guard (trace.downloaded==true) instructs the ADI device 206 to wait until the download has been completed. Once download of the new software version has completed, the script uses the assert command to query the STB 210 about the current boot, hardware and software versions. The assert command is encapsulated by means of a JSON object according to the Trace schema defined previously, and is a passed from the ADI device 206 to the STB 210 via the network. The final element of the assert command request that the Trace object returned in reply from the STB 210 is also copied to a reporting facility, in this case the email address of a test engineer. The Trace Object will also be returned to the ADI 206 and the Test Tooling 202 for logging and analysis. Lastly, the "trace.downloaded=false" line blocks other processes reading the trace.downloaded variable.

The verify download script 226 repeats the process for the subsequent software version 155P, ensuring that the test operates for successive versions of the software.

The notifyDevelopers script 222 controls a report generation process that summarises the trace information received from the STB 210 in response to Set instructions sent to the ADI device 206. In one example of the invention, the report takes the form of an e-mail that can be sent to the software developers of the software versions 153P and 155P, when a trace "decoder failure" is generated by the STB 210. The email includes the running instance of the script that resulted in the decoder failure, and the Trace objects generated by the STB 210 in the course of time as the information from the ADI device 206 was received and implemented on the device. This allows the software engineers to use the information to debug the undesired situation.

```
/*bug hunter process*/
active script notifyDevelopers( )
{ while(true) {
    atomic {
      assert(trace.failure == null,
      "software_engineering@echostar.com"
      trace.failure);
      failure = null; } } }
```

The assert statement in the script asserts that the trace process' failure variable does not contain a logged message. In case it does, the assertion fails and generates a the report mentioned above.

Here a simple trace received from the STB 210 may be used by a software engineer to debug the software or to find out a bug is still present. However, capturing traces becomes more valuable when all inputs to, and outputs from the STB 210, such as the data objects specified by the Trace 212 and Set 216 schemas, are controlled via the Test Tool module 202, and devices connected in the Test Tool system 200, and are logged to be included in the history. This history will necessarily include the data objects available under one or more of the schemas illustrated in FIG. 3.

When an assertion fails, the logged history can then show how the undesired situation was reached. The logged history then constitutes a so called "steps to reproduce" which test engineers must provide when entering bugs into the issue tracking system.

Figure 5:
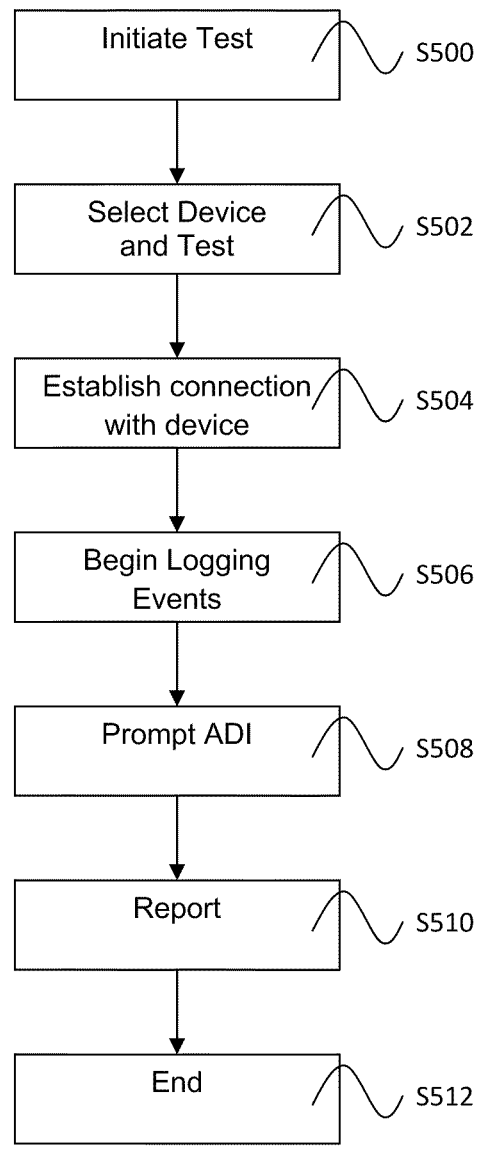
FIG. 5 is a flow chart illustrating an example sequence of actions in the operation of the system of FIG. 2.

The operation of the system illustrated in FIG. 2 will now be explained in more detail with reference to FIG. 5. FIG. 5 is a flow chart that sets out the steps and actions performed by the Test Tool module 202 in a device test phase under the operation of the scripts defined above.

The Test Tool module 202 is activated in initiation step S500 in response to a user input from a test engineer at PC or workstation 204. The Test Module provides a graphical user interface to the engineer through which the engineer may control the test system 200. An engineer may for example require the use of the system 200 to test a suite of representative test STBs 210 in a controlled testing laboratory before a new version of operating software is released for installation on STBs that have already been deployed in the home. Alternatively, in response to a technical query from a customer, the test engineer may use the system 200 to take control of the customer's STB for troubleshooting purposes.

In step S502, the test engineer selects which STB device 210 in the network is to be queried, and selects the test that is to be carried out on that device. It will be appreciated that the devices that are available for testing will be registered with one or more network servers, and that the Test Tool module 202 can query the server for access to a device. The server can give alternatives for the abstract device definitions in the script, and depending on the localisation, different options can be presented to couple the declarations of a device in a script to a device instance, allow script instances to be reused. For example, script declared device STB can be mapped to server registered device STB.7400,123456.

The Test Tool module 202 can present a list of available tests to the engineer for convenience, or allow the engineer to select tests directly via a command line entry.

In step S504, the Test Tool module 202 connects to the selected STB device 210 across the network using the STB device definition to set up a communication channel, and also initialises an instance of a traceSTB script 218 to track and handle the data objects received. Data objects are received from the STB 210 continuously as the state of the STB changes, according to notifications set out in the schemas such as trace 212. To the script a device therefore resembles a channel of information and the data objects must be buffered in the device until they are received by a script process.

The Test Tool 210 can optionally in step S506 therefore begin to log the data objects received from the STB 210 for later review.

In step S508, the Test Tool module 308 initiates an instance of the verifyDownload script to control operation of the ADI device 206. As described above, under the control of the actions defined in the script the ADI downloads control or other information, such as picture information to the STB 210. This prompts the STB 210 to generate further Trace objects for transmission to the Test Tool module 202 and where appropriate, the ADI device 206.

The data objects can be collated into a report for transmission to the engineer or other third party in step S510. In this regard, the instance of the verifyDownload script 220 that was used to initiate the test and therefore the variables encapsulated in the script can be included in the report.

In step S512, the Testing Process ends.

As the testing process is managed by scripts and relies on communication by means of data objects it is possible to run a number of different tests simultaneously, with each test being controlled by a different instance of test script, such as verifyDownloads 220.

Figure 6:
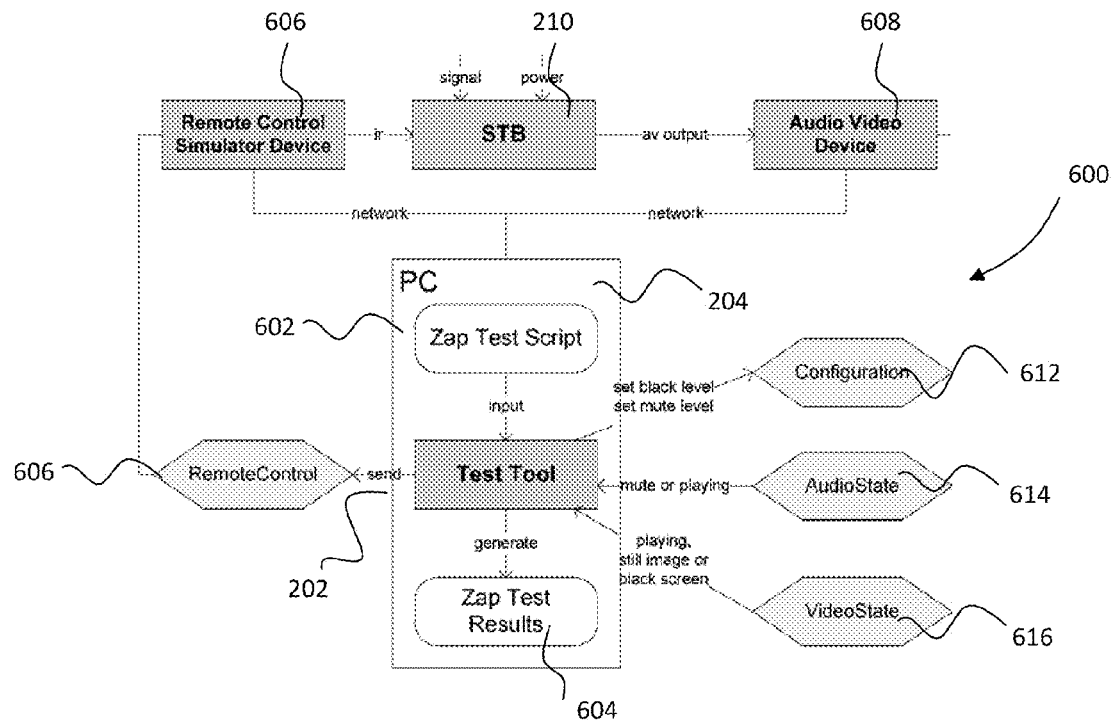
FIG. 6 is a schematic illustration of a system for monitoring the state of a STB during a channel change time test.

FIG. 6 illustrates a further example system 600 according to the invention, in which a different aspect of the STB 210 behaviour is monitored and controlled by means of a script used to implement a channel change time test. The time for the channel to change is to a large extent dependent on the audio/video decoder installed in the STB 210. As the decoder is implemented in software, its operation can be affected by other software, in particular, when it or the other software in the system is updated with a new version. Channel Change Time tests are particularly difficult to implement in black box environments, where the test engineer has only access to the trace information from the serial port of the STB, and where due to the system being an asynchronous distributed system, there are timing issues related to measurement and data processing.

In FIG. 6, the workstation 204 of FIG. 3 is shown as including two further scripts Zap Test Script 602 and Zap Test Results 604. It will be appreciated that the traceSTB script 218, the verifyDownload script 220 and Notify Developer script 222 are not shown in FIG. 6 for convenience. In practice, the traceSTB script 218, the verifyDownload script 220 and Notify Developer script 222 can optionally be included in the example of FIG. 6 if desired.

In addition to the STB 210 is a Remote Control Simulator device 606 that connects to the STB 210 to effect a channel change. In this example, the Remote Control Device can for example be implemented as a Red Rat remote control device. This allows remote control channel requests to be transmitted in the normal way to the STB 210 under the control of the workstation 204 via the network.

Additionally, the system includes Audio Video Device 608. This is used to detect blank screens, still images and playing video, as well as muted sound, and playing audio. The system further includes additional schemas Remote Control schema 610, Configuration Schema 612, AudioState schema 614 and VideoState schema 616. These scripts make it possible to detect the channel change time between the remote control command issued by device 606, (illustrated in FIG. 7 as 'zap'), and the playing Video transition (indicated by 'zap complete' in FIG. 7) indicated from the AV device 608.

As before it is necessary for the interaction with the Remote Control device 606 and the Audio Video Device 608 to be defined in one or more scripts. These definitions are abstractions of the behaviour and state of the corresponding devices in the system 600, and specify the communication protocols by which the devices are to communication with the Test Tool 202.

The script for the Audio Video Device 608 is defined below.

```
private device avd;
schema avd.VideoTransition {
    "description": "The VideoTransition schema is used to
    track video state transitions.",
    "version":{
    "description": "version identifier (major.minor.engineering)",
    "type": "string", "visible": false, "default": "1.0.0"},
    "state":
    {"description": "Target state of the video transition",
    "type": "string", "optional": true, "enum": [ "playing", "still image",
    "black screen" ] }
```

Figure 7:
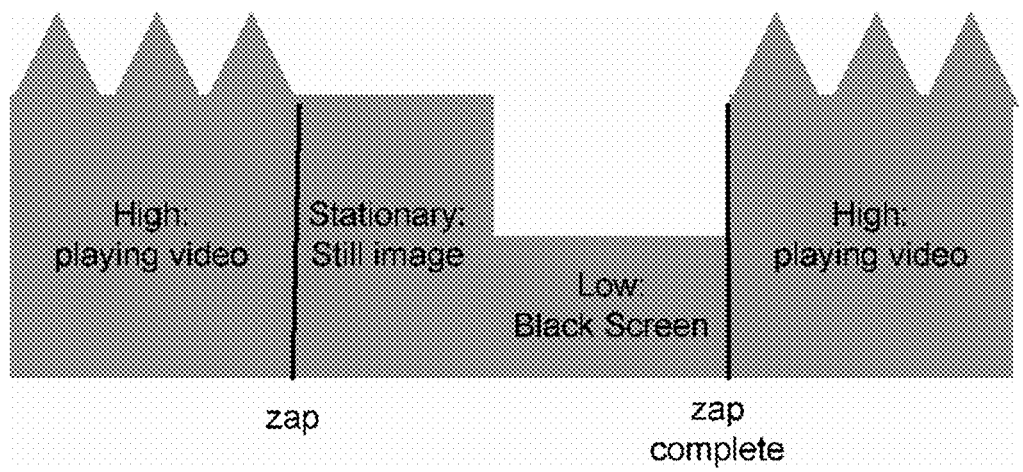
FIG. 7 illustrates a playing Video transition in an AV device, used in the channel change time test.

The script defines the capabilities of the device as VideoTransition, AudioTransition, and Configuration, and the states of the device as "playing", "still image", and "black screen". During a transition, the state of the Audio Video Device can pass through all three states as illustrated in FIG. 7.

The Audio Video Device 608 implements the Configuration Schema 612, AudioState schema 614 and VideoState schema 616 in order to connect to the test tool 202 and also to feed back data objects to the Test Tool Module 202 following the initiation of the test. The AudioState schema 614 and VideoState schema 616 define how the state information is returned to the Test Tool module 202 and requires that time stamp information be made available to monitor the duration of the test.

The Remote Control Schema is illustrated below, with the commands that must be implemented by the schema set out in the "enum" field. The Remote Control Simulator device 610 implements the Remote Control schema 510 in order to send remote control commands to the STB 210.

```
private device rcd; schema rcd.RemoteControl
{"description": "the RemoteControl schema is used to send remote
control IR commands to the STB",
"version":
    {"description": "version identifier (major.minor.engineering)",
    "type": "string",
```

-continued

```
"visible": false,
"default": "1.0.0" },
"type":
{"description": "remote type",
"type": "string",
"enum": ["Skardin", "Skardin DVR", "10 Bits"] },
"command":
{"description": "remote control command",
"type": "string",
"enum" : [ "0","1","2","3","4","5","6","7","8","9",
    "Alt Audio","Analog pass-through","Back","Blue",
    "Channel down","Channel up","Delete","Down","DVDmenu","DVR",
    "Enter","Exit", "Fav","Forward","Green","Guide","Info",
    "Left","LiveTV","Menu","Mute","OK", "PGdown","PGup","Play",
    "Power","Recall","Record","RecordedTV","Red","Res","Rewind",
    "Right","Sat","Sleep","Stop","Subtitle","Sys info","TV",
    "TVRAD","Up","View
    TV","Volume down","Volume up","Yellow"]
```

The Zap Test script 602 is also listed below. The script contains a number of variables entitled channels, channel, event and StartTime for holding information on the entire channel list, the current channel, information tracking video events, and the start time of the remote control command. Once the script is run, the channel list information is loaded into the channels variable using the load command. As indicated in the script, the channel list information may be stored in file for reference, such as a comma separate value (csv) file, and stored on the workstation 204 or an accessible location on the network, for reference. The list of channels are used to sequentially (and repeatedly) tune the STB 210.

```
/*zap test process*/
active script zap( )
{   var channels = load("channels.csv");      //channel list
    var channel;                              //current channel
    var event;                                //video event
    var startTime;                            //start time
    /*configure the audio video device*/
    avd@Configuration{"version":"1.0.0","video":{"level":"0x00",
    "timeout":1000}};
    /*pre-condition: playing video*/
    while(true)
        { /*wait for playing video*/
        if(avd?VideoTransition{"version":"1.0.0"}.state == "playing")
        { break;}
        else {rcd@Remoter("Exit");
        sleep(1000); } }
    /*perform the zap test*/
    while(true) {
        channel = channels.next( );
        startTime = rcd@RemoteControl(channel).timestamp;
        while(true)
            { event = avd?VideoTransition{ }; //receive video event
            state = event.state;
            if(state == "playing")
            { log(event.timestamp - startTime); //log zap duration
            break:                                         } }
} }
```

The script uses the Configuration schema of the AV Device 608 to start the Audio Video device 508 with specific parameters, such as the video duration required for the detection of black screens and still images. A still image can be identified as a number of equal images that persist for a specified length of time, while a black image is identified as a screen that has levels below a threshold. This consideration is required to distinguish from images in active video that might appear as black screen or a still image, but that are actually part of the video signal. The configuration schema additionally contains a level field which is used to determine the black video threshold.

The script sets its own pre-condition with the first while statement by checking playing video and sending 'Exit' (leaving the menu) in case it does not receive the Playing video notification. If playing video is detected, then the condition in the second while statement is processed and the script 602 causes the Remote Control Device 610 to send repeated remote control commands to the STB 210 to change the channel. Timestamp information of the response from the STB 210 is stored in the startTime variable each time the channel is changed.

VideoTransition information is made available by the Audio Video Device 608 under the Video State schema 616 and is received when ever the state of the video changes between "playing", "still" and "black screen". When a VideoState data object is received from the Audio Video Device (avd), it is stored in the event variable, and verified against the state 'playing'. In this way, when the state of the Audio Video Device 608 is first detected as "playing", after the channel change, the time for the change to occur can be calculated by deducting the present time stamp value, from the Start Time timestamp value. The results of the test can then be logged for the channel, and a subsequent channel change instruction sent by the script to the Audio Video Device, and stored in the Test Tool module 202 for review.

Although the test described above is expressed in terms of a Video State transition, a transition under the Audio State schema can be performed in a similar fashion by monitoring the "MutedSound" and "Playing" Audio states of the device.

An alternative test that can be performed using the capabilities expressed in the AudioState 614 and VideoState 616 schemas is a lip synchronisation tests in which the timestamp information of the respective audio and video streams can be compared.

A further aspect of the testing systems 300 and 600 encompasses aspects of the hardware systems used in the network. This aspect is implemented by means of the Relays interface illustrated in FIG. 8.

Figure 8:
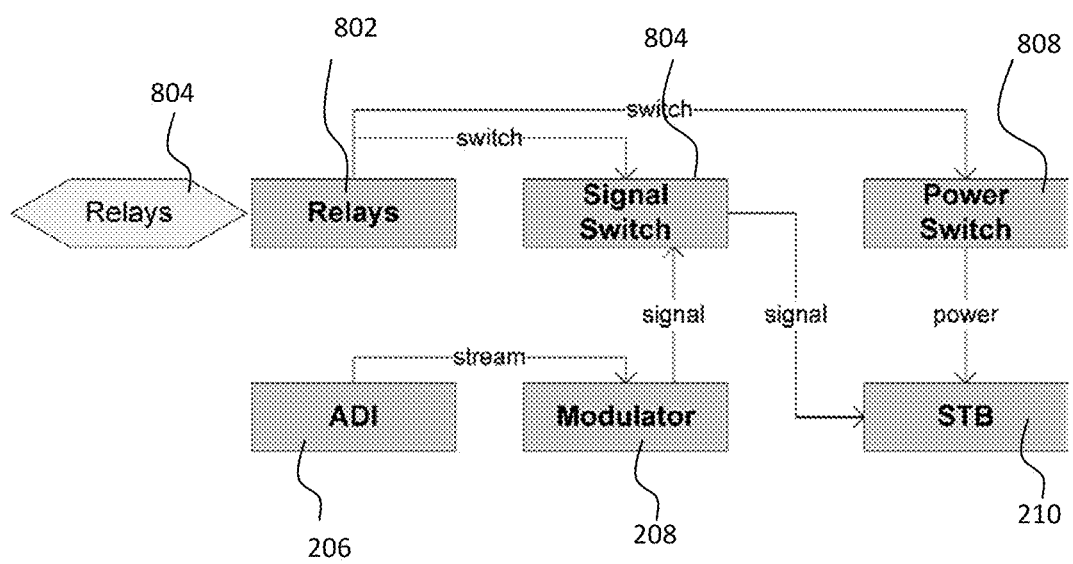
FIG. 8 is a schematic illustration of a Relays interface monitoring and control system.

The Relays 802 device is designed to switch equipment on and off via the relays interface 804 of the device. FIG. 8 illustrates the situation for STB 210, but each device in the testing system will implement a version of the relay interface to operate in this way. In particular the power input 806 to the STB 210 can be switched on and off, and the satellite (or cable) signal input 808 can be switched for another input. This may be a missing signal, an attenuated signal or a different signal entirely.

Although, the control and monitoring system described above has been illustrated as a debugging tool, it will be appreciated that it has a wider application to troubleshoot viewing problems as they arise in a viewer's STB. In such situations, the viewer can contact a test engineer via a helpline, and the test engineer can use the test tool 202 to take control of the viewer's STB in real time and perform one or more control and testing operations. As the test engineer controls the STB, the STB provides Trace information to the test tool 202 for immediate review by the test engineer and further action. This greatly improves the capacity of a test engineer to interact with the device and diagnose the technical problem. In particular, the test engineer can run a number of different tests on the STB in response to data received from the STB in a previous test until the problem has been found, and can also verify that the STB is then working properly.

Although in the examples above the functionality of the system has been described with references to JSON and JavaScript, it will be appreciated that any compatible languages providing similar functionality could be used with the system, either in conjunction with JSON and JavaScript, or in its place. In alternative embodiments, for example instead of JSON, XML may be used, and indeed any kind of object definition language can be used for data exchange.

Further, in the above examples, although scripts for providing a debugging process and for implementing a channel change test have been described, it will be appreciated that these are intended to be illustrative. Scripts providing further functionality could also be used in the system. Further it will be appreciated that the testing tool 202 can operate on the basis of many different scripts operating together or in isolation. The invention is not limited to the particular scripts illustrated above, or to combinations of those scripts.

Although, the invention has been described with reference to an example including television set top boxes, it will be appreciated that the apparatus and method described can be implemented in any system of distributed electronic components having a processor and software requiring occasional or periodic updating. The examples described above are provided by way of illustration, and should not be construed as limiting the invention defined in the subsequent claims.

The invention claimed is:

1. A system for monitoring and controlling the operation of devices in a distributed network of broadcast devices, the system comprising:
   at least one AV decoder device for decoding video and/or audio signals, the AV decoder device being operable to output state information representative of its internal state;
   a controller; and
   a network for transmitting data signals between the controller and the at least one AV decoder device;
   wherein, during a device testing phase, the controller is operable to transmit control and AV content data to the at least one AV decoder device causing the at least one AV decoder device to undertake an action in response to the data,
   wherein, during the device testing phase, the at least one AV decoder device is operable to undertake an action in response to the control and AV content data transmitted by the controller, and to transmit state information data to the controller,
   wherein the state information corresponds to the state of the AV decoder device during the action undertaken in response to receiving the control and AV content data; and
   wherein the controller is operable to output a data result based on the state information data received from the at least one AV decoder device,
   wherein, during the device testing phase, the controller runs a script defining the nature of the control and AV content data, and the sequence in which the control and AV content data is to be transmitted,
   wherein, at the end of the device testing phase, the controller is operable to output the data result that comprises an instance of the script that was run during the device testing phase with the state information, and
   wherein the state information transmitted by the at least one AV decoder device includes debugging information.

2. The system of claim 1, comprising a data streaming device in communication with the controller over the network and operable to generate control and AV content data for transmission to the at least one AV decoder device in response to control data received from the controller.

3. The system of claim 1, wherein the controller is operable to log the data signals transmitted between the controller and the at least one AV Decoder device.

4. The system of claim 1, wherein the control data references an updated version of operating software for the at least one AV decoder device, and, in response to receiving the control data, the at least one AV decoder device is operable to update its operating software to the version referenced in the control data.

5. The system of claim 1, wherein the controller is operable to output the state information received from the at least one AV decoder device during the device testing phase.

6. A device test tool for monitoring and controlling the operation of devices in a distributed network of broadcast devices comprising at least one AV decoder device for decoding video and/or audio signals, the AV decoder device being operable to output state information representative of its internal state;
   wherein, during a device testing phase, the device test tool is operable to:
      transmit control and AV content data to the at least one AV decoder device via a network causing the at least one AV decoder device to undertake, during the device testing phase, an action in response to the data;
      receive from the at least one AV decoder state information data transmitted by the at least one AV decoder device during the device testing phase, wherein the state information corresponds to the state of the at least one AV decoder device during the action undertaken in response to receiving the control and AV content data;
      output a data result based on the device state information data received from the at least one AV decoder device,
   wherein, during the device testing phase, the device test tool runs one or more scripts defining the nature of the control and AV content data, and the sequence in which the control and AV content data is to be transmitted,
   wherein, at the end of the device testing phase, the device test tool is operable to output the data result that comprises an instance of the script that was run by the at least one AV decoder device during the device testing phase with the state information, and
   wherein the state information transmitted by the at least one AV decoder device includes debugging information.

7. A method for monitoring and controlling the operation of devices in a distributed network of broadcast devices comprising at least one AV decoder device for decoding video and/or audio signals, a controller, and a network for transmitting data signals between the controller, and the at least one AV decoder device, wherein the AV decoder device is operable to output state information representative of its internal state;
   the method comprising:
      transmitting control and AV content data to the at least one AV decoder device to cause the at least one AV decoder device to undertake, during a device testing phase, an action in response to the control and AV content data;
      receiving at the controller state information data transmitted from the at least one AV decoder device during the device testing phase, wherein the state information corresponds to the state of the at least one AV decoder device during the undertaken action; and
      outputting a data result based on the state information data received from the at least one AV decoder device,
      running, during the device testing phase by the controller, one or more scripts defining the nature of the control and AV content data, and the sequence in which the control and AV content data is to be transmitted to the at least one AV decoder device, and outputting, by the controller at the end of the device testing phase, an instance of the script that was run during the device testing phase with the state information, wherein the state information transmitted by the at least one AV decoder device includes debugging information.

8. The method of claim 7, further comprising generating the control and AV content data for transmission to the at least one AV decoder device using a data streaming device in response to control data received from the controller.

9. The method of claim 7, further comprising logging the data signals transmitted between the controller and the at least one AV Decoder device.

10. The method of claim 7, wherein the control data references an updated version of operating software for the at least one AV decoder device, and, in response to receiving the control data, the at least one AV decoder device is operable to update its operating software to the version referenced in the control data.

11. The method of claim 10, wherein the state information transmitted by the at least one AV decoder device includes debugging information.

12. The method of claim 11, further comprising outputting from the controller the state information received from the at least one AV decoder device during the device testing phase.

13. A computer program product on which computer code is stored on a tangible non-transitory medium, wherein when the computer code is executed on a computer of a controller, the computer is caused to perform a method comprising:

transmitting control and AV content data to at least one AV decoder device to cause the at least one AV decoder device to undertake, during a device testing phase, an action in response to the control and AV content data;

receiving, at the controller, state information data transmitted from the at least one AV decoder device during the device testing phase, wherein the state information corresponds to the state of the at least one AV decoder device during the undertaken action; and outputting a data result based on the state information data received from the at least one AV decoder device, wherein, during the device testing phase, the controller runs one or more scripts defining the nature of the control and AV content data, and the sequence in which the control and AV content data is to be transmitted, wherein the controller, at the end of the device testing phase, is operable to output the data result that comprises an instance of the script that was run during the device testing phase with the state information, and wherein the state information transmitted by the at least one AV decoder device includes debugging information.

14. A system for monitoring and controlling the operation of devices in a distributed network of broadcast devices, the system comprising:

at least one AV decoder device for decoding video and/or audio signals, the AV decoder device being operable to output state information representative of its internal state;

a controller;

a network for transmitting data signals between the controller, and the at least one AV decoder device;

wherein, during a device testing phase, the controller is operable to transmit control and AV content data to the at least one AV decoder device causing the at least one AV decoder device to undertake an action in response to the control and AV content data;

and wherein, during the device testing phase, the at least one AV decoder device is operable to undertake an action in response to the control and AV content data transmitted by the controller, and to transmit state information data to the controller, wherein the state information corresponds to the state of the AV decoder device during the action undertaken in response to receiving the control and AV content data; and the controller is operable to output a data result based on the state information data received from the at least one AV decoder device; and wherein, during the device testing phase, the controller runs one or more scripts defining the nature of the control and AV content data, and the sequence in which the control and AV content data is to be transmitted, wherein, at the end of the device testing phase, the controller is operable to output an e-mail with a running instance of the script that was run during the device testing phase with the state information, and includes any trace objects generated by the AV decoder device during the device testing phase, and wherein the state information transmitted by the at least one AV decoder device includes debugging information.

15. A method for monitoring and controlling the operation of devices in a distributed network of broadcast devices comprising at least one AV decoder device for decoding video and/or audio signals, a controller, and a network for transmitting data signals between the controller, and the at least one AV decoder device, wherein the AV decoder device is operable to output state information representative of its internal state, the method comprising:

transmitting control and AV content data to the at least one AV decoder device to cause the at least one AV decoder device to undertake, during a device testing phase, an action in response to the control and AV content data;

receiving at the controller state information data transmitted from the at least one AV decoder device during the device testing phase, wherein the state information corresponds to the state of the at least one AV decoder device during the action undertaken in response to receiving the control and AV content data;

outputting a data result based on the state information data received from the at least one AV decoder device;

running one or more scripts at the controller, wherein the scripts define the nature of the control and AV content data, and the sequence in which the control and AV content data is to be transmitted; and outputting, at the end of the device testing phase, a data result that comprises an instance of the script that was run with the state information, wherein, during the device testing phase, the controller runs the one or more scripts defining the nature of the control and AV content data, and the sequence in which the control and AV content data is to be transmitted, wherein the controller is operable to output the instance of the script that was run during the device testing phase with the state information, and wherein the state information transmitted by the at least one AV decoder device includes debugging information.

16. The method of claim 7, further comprising:

detecting a channel change time, wherein the channel change time is an amount of time between:

a time that a remote control device command is issued to the AV decoder device to change from a first channel to a second channel, and a time that the AV decoder device outputs video information received in the second channel.

17. The method of claim 16, wherein detecting the channel change time comprises:

detecting one of a video black screen duration and a still image duration, wherein the black screen corresponds to a screen level below a threshold screen level, and wherein the still image duration corresponds to a number of same images that persist for a specified length of time.

18. The method of claim 7, further comprising:

detecting an audio change time, wherein the audio change time is an amount of time between:

a time that a remote control device command is issued to the AV decoder device to change from a first audio volume to a second audio volume, and a time that the AV decoder device outputs the second audio volume.

19. The method of claim 1, further comprising:

outputting a report, wherein the report includes the instance of the script that was output at the end of the device testing phase and the state information data transmitted from the at least one AV decoder device to the controller.

* * * * *